US012704387B2

(12) United States Patent
Seo

(10) Patent No.: US 12,704,387 B2
(45) Date of Patent: Aug. 11, 2026

(54) ELECTRONIC DEVICE AND METHOD FOR PROVIDING THREE-DIMENSIONAL MAP

(71) Applicant: Samsung Electronics Co., Ltd., Suwon-si (KR)

(72) Inventor: Youngjun Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 18/644,680

(22) Filed: Apr. 24, 2024

(65) Prior Publication Data

US 2024/0271960 A1 Aug. 15, 2024

Related U.S. Application Data

(63) Continuation of application No. PCT/KR2022/015721, filed on Oct. 17, 2022.

(30) Foreign Application Priority Data

Oct. 27, 2021 (KR) ........................ 10-2021-0144943
Dec. 10, 2021 (KR) ........................ 10-2021-0176848

(51) Int. Cl.
*G01C 21/00* (2006.01)
*G06T 7/246* (2017.01)
(Continued)

(52) U.S. Cl.
CPC .......... *G01C 21/3848* (2020.08); *G06T 7/248* (2017.01); *G06T 7/74* (2017.01);
(Continued)

(58) Field of Classification Search
CPC ....... G01C 21/3848; G06T 7/248; G06T 7/74; G06T 17/05; G06T 2207/30181;
(Continued)

(56) References Cited

U.S. PATENT DOCUMENTS 7,376,284 B2 * 5/2008 Tao ......................... G06T 17/05 382/285
7,500,391 B2 3/2009 Woro
(Continued)

FOREIGN PATENT DOCUMENTS

JP 2001-133275 A 5/2001
JP 2009-053206 A 3/2009
(Continued)

OTHER PUBLICATIONS

International Search Report dated Jan. 31, 2023, issued in International Patent Application No. PCT /KR2022/015721.
Solar Position Algorithm (SPA), Jan. 2008.
Korean Office Action dated May 8, 2026, issued in Korean Application No. 10-2021-0176848.

*Primary Examiner* — Muhammad Shafi
(74) *Attorney, Agent, or Firm* — Jefferson IP Law, LLP

(57) ABSTRACT

An electronic device and a method of operating the same are provided. The electronic device includes a camera module, memory storing one or more computer programs, and one or more processors communicatively coupled to the memory and the camera module, wherein the one or more computer programs include computer-executable instructions that, when executed by the one or more processors, cause the electronic device to acquire an image captured by the camera module, acquire a three-dimensional map, based on location information of the electronic device, identify, in the image, a first object corresponding to a celestial body and a second object corresponding to a new terrain feature that is not included in the three-dimensional map, acquire three-dimensional image data of the new terrain feature for updating the three-dimensional map, based on information related to the second object identified based on a location of the first object, and provide a three-dimensional map updated through reflection of the acquired image data.

21 Claims, 9 Drawing Sheets

(51) Int. Cl.
*G06T 7/73* (2017.01)
*G06T 17/05* (2011.01)
*G06V 10/46* (2022.01)
*G06V 20/10* (2022.01)

(52) U.S. Cl.
CPC .............. *G06T 17/05* (2013.01); *G06V 10/46* (2022.01); *G06V 20/10* (2022.01); *G06T 2207/30181* (2013.01)

(58) Field of Classification Search
CPC . G06T 7/579; G06T 7/73; G06T 2207/10016; G06T 2207/10032; G06T 2207/20081; G06T 2207/20084; G06V 10/46; G06V 20/10; G06F 1/16; G09B 29/00
USPC .......................................................... 701/448
See application file for complete search history.

(56) References Cited

U.S. PATENT DOCUMENTS

| | | | | |
|---|---|---|---|---|
| 7,733,342 | B2 * | 6/2010 | Kim | G06T 7/60 345/426 |
| 8,437,554 | B2 | 5/2013 | Kim et al. | |
| 11,127,200 | B1 * | 9/2021 | Leise | H04N 23/64 |
| 2022/0042823 | A1 * | 2/2022 | Lee | G01C 11/02 |

FOREIGN PATENT DOCUMENTS

| | | | |
|---|---|---|---|
| KR | 10-1108257 | B1 | 1/2012 |
| KR | 10-1116289 | B1 | 3/2012 |
| KR | 10-2014-0049232 | A | 4/2014 |
| KR | 10-1396338 | B1 | 5/2014 |
| KR | 10-1871441 | B1 | 6/2018 |
| KR | 10-2233260 | B1 | 3/2021 |
| KR | 10-2272143 | B1 | 7/2021 |

* cited by examiner

ELECTRONIC DEVICE AND METHOD FOR PROVIDING THREE-DIMENSIONAL MAP

CROSS-REFERENCE TO RELATED APPLICATION(S)

This application is a continuation application, claiming priority under § 365(c), of an International application No. PCT/KR2022/015721, filed on Oct. 17, 2022, which is based on and claims the benefit of a Korean patent application number 10-2021-0144943, filed on Oct. 27, 2021, in the Korean Intellectual Property Office, and of a Korean patent application number 10-2021-0176848, filed on Dec. 10, 2021, in the Korean Intellectual Property Office, the disclosure of each of which is incorporated by reference herein in its entirety.

BACKGROUND

1. Field

The disclosure relates to an electronic device and a method for providing a three-dimensional (3D) map.

2. Description of Related Art

Recently, electronic devices have been developed in various forms for convenience of users, and provide maps for services, such as location tracking, driving on roads, and finding ways or places. As recent interest in three-dimensional (3D) images increases, technology for providing a map using a 3D image is being developed.

A need of the three-dimensional map is continuously increasing, various services operating based on the three-dimensional map are being developed, and various methods for providing the three-dimensional map are being developed. The various methods include a method of making a three-dimensional map using a satellite moving in predetermined orbit, a method of generating a three-dimensional map by combining three-dimensional shapes collected using directly measured information/Lidar, and a method of generating a three-dimensional map by combining Lidar point information measured in the air through an aerial shot using Lidar.

In the methods of generating the three-dimensional map, the three-dimensional map is generated by performing directly measurement with equipment, such as Lidar or performing measurement using an image and equipment while seeing the ground from a high place using satellites/airplanes and combining overlapping information to make a shape.

The above information is presented as background information only to assist with an understanding of the disclosure. No determination has been made, and no assertion is made, as to whether any of the above might be applicable as prior art with regard to the disclosure.

SUMMARY

Existing methods of making a three-dimensional map require continuous investment of a lot of money and time, there are limitations on generating a three-dimensional map through measurement of a target directly by a user, and making a three-dimensional map using Lidar is effective only for targets within a short range. Accordingly, the existing methods of making the three-dimensional map cannot make a map for a remote target and thus should make a map while directly moving. Therefore, a map update cycle becomes slower. Further, a method of making a three-dimensional map using satellites is not appropriate for commercial services that require the latest map, considering satellite a capturing cycle, costs, and accuracy of the satellite.

Users capture various targets through their own electronic devices, and many autonomous vehicles capture images in real time. Such a capturing action is performed on the ground, and the captured images includes unknown new buildings or terrains.

Aspects of the disclosure are to address at least the above-mentioned problems and/or disadvantages and to provide at least the advantages described below. Accordingly, an aspect of the disclosure is to provide an electronic device and a method for generating a three-dimensional image for new terrain features included in the image, based on a celestial body included in the image, and providing a three-dimensional map.

Additional aspects will be set forth in part in the description which follows and, in part, will be apparent from the description, or may be learned by practice of the presented embodiments.

In accordance with an aspect of the disclosure, an electronic device is provided. The electronic device includes a camera module, memory storing one or more computer programs, and one or more processors communicatively coupled to the memory and the camera module. In accordance with an aspect of the disclosure, the one or more computer programs include computer-executable instructions that, when executed by the one or more processors, cause the electronic device to acquire an image captured by the camera module, acquire a three-dimensional map, based on location information of the electronic device, identify, in the image, a first object corresponding to a celestial body in a second object corresponding to a new terrain feature that is not included in the three-dimensional map, acquire three-dimensional image data of the new terrain feature for updating the three-dimensional map, based on information related to the second object identified based on a location of the first object, and provide a three-dimensional map updated through reflection of the acquired image data.

In accordance with another aspect of the disclosure, a method of operating an electronic device is provided. The method includes acquiring an image captured by a camera module of the electronic device, acquiring a three-dimensional map, based on location information of the electronic device, identifying, in the image, a first object corresponding to a celestial body and a second object corresponding to a new terrain feature that is not included in the three-dimensional map, acquiring three-dimensional image data of the new terrain feature for updating the three-dimensional map, based on information related to the second object identified based on a location of the first object, and providing a three-dimensional map updated through reflection of the acquired image data.

In accordance with another aspect of the disclosure, one or more non-transitory computer-readable storage media storing computer-executable instructions that, when executed by one or more processors of an electronic device, cause the electronic device to perform operations are provided. The operations include acquiring an image captured by a camera module of the electronic device, acquiring a three-dimensional map, based on location information of the electronic device, identifying, in the image, a first object corresponding to a celestial body and a second object corresponding to a new terrain feature that is not included in the three-dimensional map, acquiring three-dimensional image data of the new terrain feature for updating the three-dimensional map, based on information related to the second object identified based on a location of the first object, and providing a three-dimensional map updated through reflection of the acquired image data.

An electronic device and a method for providing a three-dimensional map according to an embodiment of the disclosure can generate a three-dimensional image by calculating and combining a distance and an angle between a new terrain feature included in the image and a user, based on a location of a celestial body included in the captured image and update or generate a three-dimensional map, thereby generating and updating the latest three-dimensional map without any use of special equipment or human resources to capture the three-dimensional image. As a result, costs for generating and updating the three-dimensional map can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The term and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
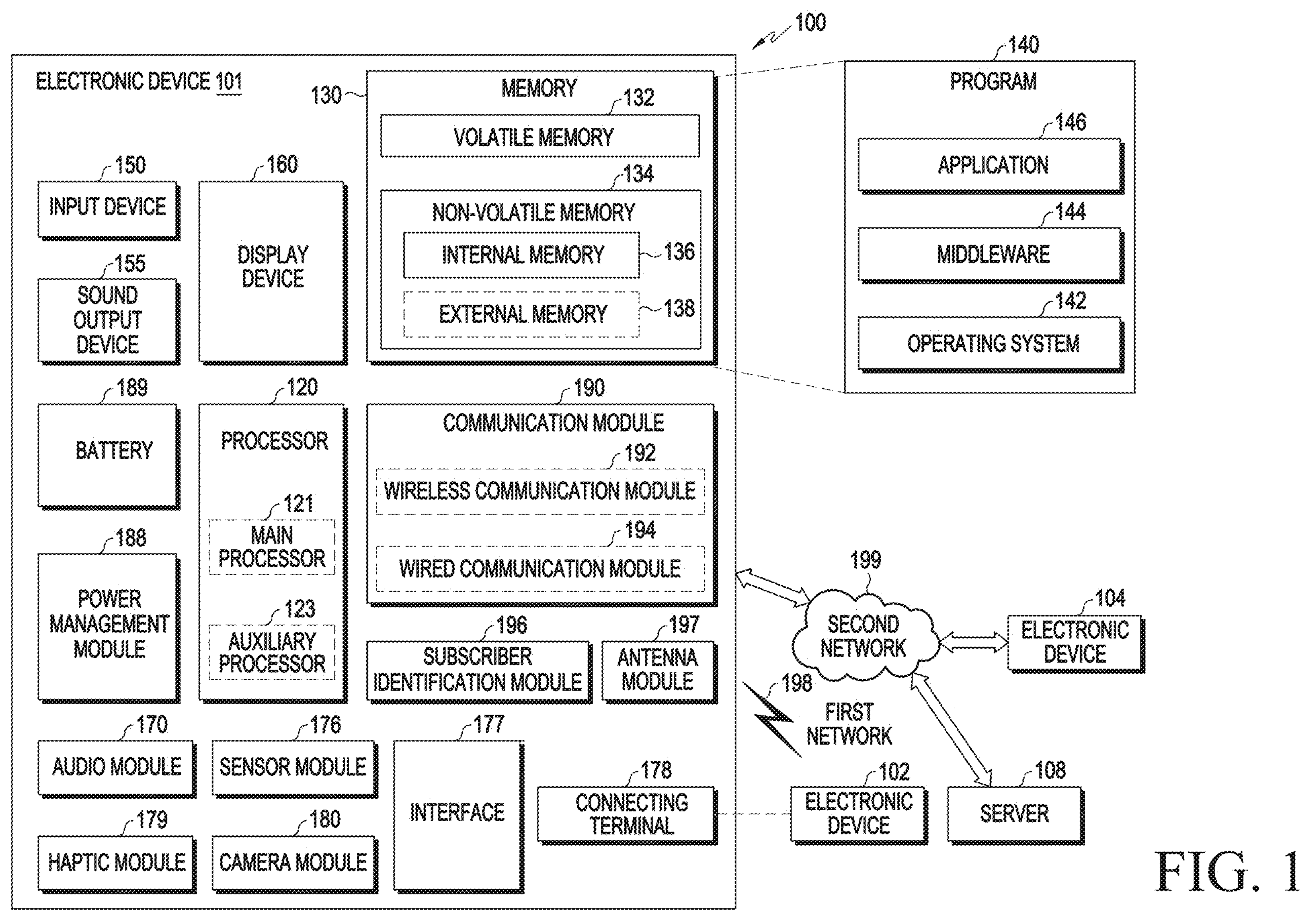
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160)

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device 101 for providing a three-dimensional map according to an embodiment is described based on the electronic device 101 described in FIG. 1.

Referring to FIG. 1, the electronic device 101 according to an embodiment may include various elements (for example, the processor 120, the memory 130, the display module 160, the sensor module 176, the camera module 180, and the communication module 190) described in FIG. 1 to provide a three-dimensional map. The electronic device 101 may further include other elements for providing a three-dimensional map and also a location tracking module (not shown) for tracking the location of the electronic device 101.

The processor 120 of the electronic device 101 according to an embodiment may be configured to provide a three-dimensional map generated or updated through reflection of three-dimensional image data for an object (hereinafter, referred to as a second object) for a new terrain feature included in an image captured based on a location of an object (hereinafter, referred to as a first object) corresponding to a celestial body included in a captured image. The processor 120 may perform functions or operations for executing an application related to a three-dimensional map and providing the three-dimensional map through the executed application.

The processor 120 of the electronic device 101 according to an embodiment may acquire an image captured by the camera module 180 and analyze the image through an image analysis algorithm to identify the first object corresponding to the celestial body in the image and an object (hereinafter, referred to as a third object) corresponding to at least one terrain feature. For example, the processor 120 may acquire location information and the image including the celestial body from the memory or an external electronic device. For example, the captured image or the acquired image may be a two-dimensional image.

According to an embodiment of the disclosure, the processor 120 may acquire location information of the electronic device 101 through a location tracking function (for example, an algorithm, a program, an application, or an operation). The location information of the electronic device 101 may be global positioning system (GPS) information (for example, including latitude, longitude, altitude, and time information) indicating the location in which the electronic device 101 is positioned at a time at which the image is captured. The captured image may include a time at which the image is captured and location information and stored in the memory 130.

According to an embodiment of the disclosure, the processor 120 may acquire a three-dimensional map stored in the server 108 or the memory 130, based on location information of the electronic device 101 and identify at least one terrain feature (hereinafter, referred to as a third object) included in the three-dimensional map. The processor 120 may identify a second object corresponding to a new terrain feature different from at least one terrain feature included in the three-dimensional map by comparing and analyzing the three-dimensional map and the captured image. When the first object corresponding to the celestial body and the second object for the new terrain feature are identified in the captured image, the processor 120 may identify that it is required to update the three-dimensional map or generate a new three-dimensional map and perform an operation for updating or generating the three-dimensional map. The processor 120 may generate identification information (identity (ID)) of the identified new terrain feature. The identification information may be generated using location information or a shop name of the new terrain feature, and may be mapped to and stored in the three-dimensional map when the three-dimensional map is generated.

According to an embodiment of the disclosure, when identifying the location of the celestial body, the processor 120 may identify a type of the celestial body (for example, sun, moon, satellite, or another celestial body of which the location can be identified) included in the captured image and acquire information related to the location of the celestial body (for example, azimuth and altitude information) from an external electronic device (for example, the external electronic device 102 or 104 or the server 108 of FIG. 1) by using the identified type, time information (for example, a date on which the image is captured and a time at which the image is captured), and location information (for example, capturing location) of the electronic device 101. For example, the processor 120 may calculate a horizontal coordinate value of the celestial body within the margin of error (for example, +/−0.0003 degrees), based on the received information related to the celestial body (for example, azimuth and altitude information) and identify the location of the celestial body, based on the calculated horizontal coordinate value. For example, the processor 120 may identify the location of the celestial body through an application including machine learning or an image algorithm, based on the location of the first object (for example, an image coordinate value) in the captured image, view angle information of the camera module 180, and/or location information of the electronic device 101 (for example, latitude, longitude, altitude, and time).

According to an embodiment of the disclosure, the processor 120 may identify a distance between the second object and the electronic device 101, based on the location of the first object, acquire three-dimensional image data (or shape) of a new terrain feature for updating the three-dimensional map, based on the identified distance, and provide the three-dimensional map updated through reflection of the acquired image data. The processor 120 may control the display module 160 to display the updated three-dimensional map. The three-dimensional image data of the second object may be directly generated by the electronic device 101 or generated by an external electronic device (for example, the external electronic device 102 or 104 or the server 108 of FIG. 1). The three-dimensional map may be directly updated by the electronic device 101 or updated by the external electronic device (for example, the external electronic device 102 or 104 or the server 108 of FIG. 1) through reflection of the three-dimensional image data of the second object. For example, when the electronic device generates the three-dimensional image data of the second object corresponding to the new terrain feature and updates the three-dimensional map, the processor 120 may control the communication module 190 to transmit the three-dimensional image data and/or the updated three-dimensional map to the external electronic device. In another example, when the three-dimensional map is updated by the external electronic device through reflection of the three-dimensional image data of the second object, the processor 120 may control the communication module 190 to transmit information for updating the three-dimensional map (for example, information related to the location of the first object, information related to at least one terrain feature included in the captured image, location information of the electronic device 101, and the captured image) to the external electronic device. The processor 120 may control the communication module 190 to receive the updated three-dimensional map obtained by reflecting the three-dimensional image data generated by the external electronic device from the external electronic device and store the updated three-dimensional map in the memory 130. The information related to at least one terrain feature may include at least one of an image part of the second object, identification information of the second object corresponding to the new terrain feature, and identification information of the third object corresponding to another terrain feature. The information related to at least one terrain feature may further include an image part of the third object. The location information of the electronic device 101 may include GPS information (for example, latitude, longitude, altitude, and time) and position information (for example, roll, pitch, and yaw).

FIGS. 2, 3, 4, and 5 illustrate an electronic device providing a three-dimensional map according to an embodiment of the disclosure.

Referring to FIGS. 2, 3, 4, and 5, the processor 120 of the electronic device 101 according to an embodiment may designate a location (for example, a captured image) of the electronic device 101 in the captured image acquired based on location information of the electronic device 101.

According to an embodiment of the disclosure, the processor 120 may acquire feature points 221 and 223 for a shape of a second object 220 and feature points 231 and 233 for a shape of a third object 230 corresponding to new terrain features in the captured image. Although the feature points 221 and 223 and the feature points 231 and 233 identified in upper areas of respective objects are described as examples as illustrated in FIGS. 2, 3, 4, and 5, the disclosure is not limited thereto, and the processor 120 may extract feature points of other areas according to the predetermined number that may generate a three-dimensional image corresponding to a real shape of the object.

According to an embodiment of the disclosure, the processor 120 may identify an angle (β) between a location 203*a* of a first object 210 and the feature points 221 and 223 of the second object and identify an angle (α) between the location 203*a* of the first object 210 and the feature points 231 and 233 of the third object 230 and a distance (d) to the location 21*a* of the electronic device 101. The angle (β) of the feature points 221 and 223 of the second object 220 and the angle (α) and the distance (d) of the feature points 231 and 233 of the third object 230 may be calculated by an application including machine learning or an image analysis function according to a command of the processor 120. The processor 120 may identify a distance (d') of the feature points 221 and 223 of the second object 220, based on the angle (β) of the feature points 221 and 223 of the second object 220 and the angle (α) and the distance (d) of the feature points 231 and 233 of the third object 230. The distance (d') of the feature points 221 and 223 of the second object 220 may be calculated as shown in Equation 1 below. α-α' indicates an angle change between a first angle (β) measured at a first time point and a second angle (β') measured at a second time point for each of the feature points 221 and 223 of the second object 220, and B-B' indicates an angle change between a first angle (α) measured at a first time point and a second angle (α') measured at a second time point for each of the feature points 231 and 233 of the third object 230.

$$d' = \frac{\alpha - \alpha'}{\beta - \beta'} \times d \qquad \text{Equation 1}$$

Figure 2:
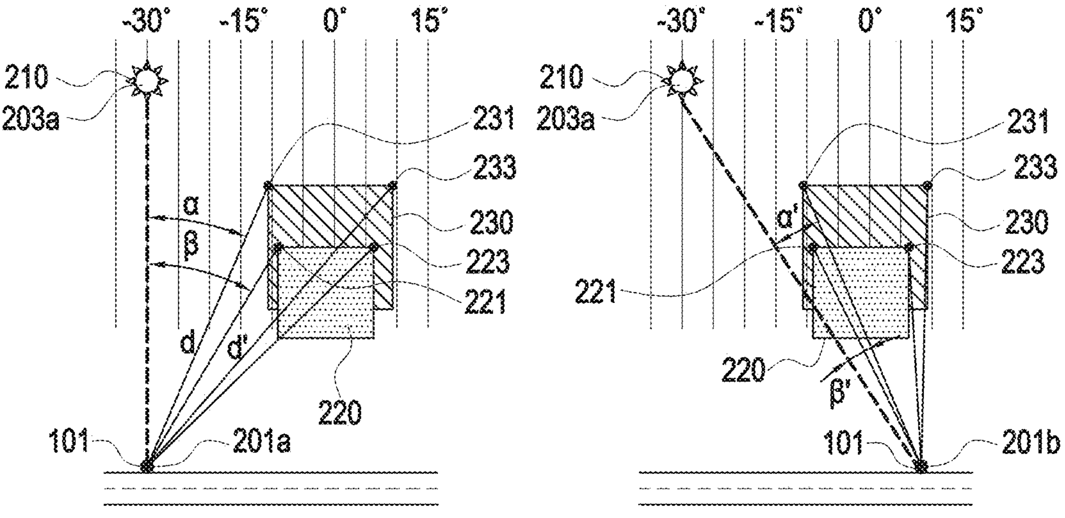
FIG. 2 illustrates an electronic device providing a three-dimensional map according to an embodiment of the disclosure.

According to an embodiment of the disclosure, at the first location 201*a* of the electronic device 101, the processor 120 may identify the first angle (β) of each of the feature points 221 and 223 of the second object 220 and the first angle (α) of each of the feature points 231 and 233 of the third object 230 from the location 203*a* of the first object 210 as illustrated in FIG. 2. When the electronic device 101 moves without movement of the first object 210, at a second location 201*b*, the processor 120 may identify the second location 201*b* of the electronic device 101 and identify the second angle (β') between the first location 203*a* of the first object 210 and each of the feature points 221 and 223 of the second object 220 and the second angle (α') between the first location 203*a* of the first object 210 and each of the feature points 231 and 233 of the third object 230. The processor 120 may identify an angle change (β-β') of each of the feature points 221 and 223 of the second object 220, based on the first angle (β) and the second angle (β') of each of the feature points 221 and 223 of the second object 220 and identify an angle change (α-α') of each of the feature points 231 and 233 of the third object 230, based on the first angle (α) and the second angle (α') of each of the feature points 231 and 233 of the third object 230. The processor 120 may identify a distance between the electronic device 101 and the feature points 221 and 223 of the second object 220, based on the distance (d) between the electronic device 101 and the feature points 231 and 233 of the third object 230, the angle change (β-β') of each of the feature points 221 and 223 of the second object 220, and the angle change (α-α') of each of the feature points 231 and 233 of the third object 230.

Figure 3:
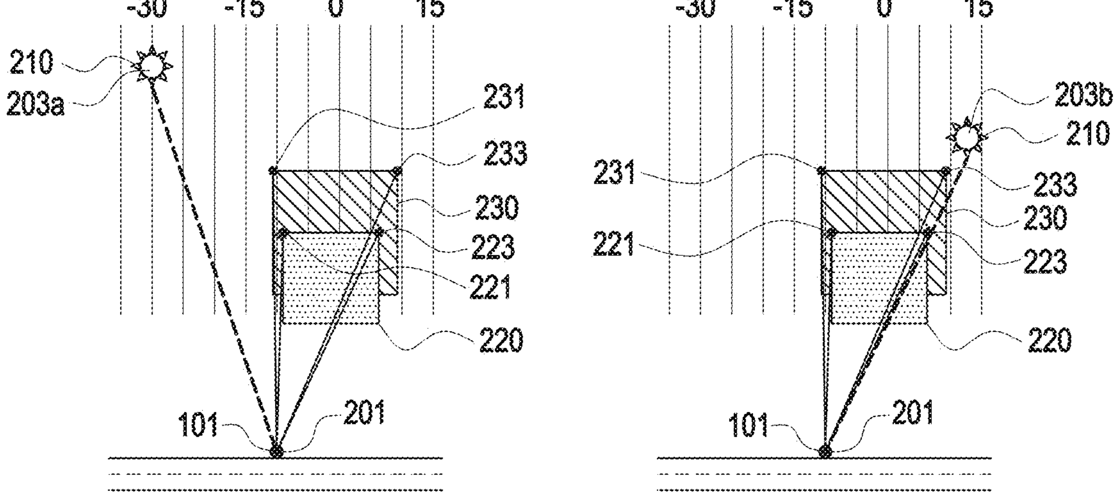
FIG. 3 illustrates an electronic device providing a three-dimensional map according to an embodiment of the disclosure.

According to an embodiment of the disclosure, when the first object 210 moves without movement of the electronic device 101 as illustrated in FIG. 3, the processor 120 may identify a second location 203*b* of the first object 210 and identify an angle change of each of the feature points 221 and 223 of the second object 220 between the first location 203*a* and the second location 203*b* of the first object 210. The processor 120 may identify an angle change of each of the feature points 231 and 233 of the third object 230 between the first location 203*a* and the second location 203*b* of the first object 210. The processor 120 may identify a distance (d') between the electronic device 101 and each of the feature points 221 and 223 of the second object 220, based on the distance (d) between the electronic device 101 and each of the feature points 231 and 233 of the third object 230, the angle change (β-β') of each of the feature points 221 and 223 of the second object 220, and the angle change (α-α') of each of the feature points 231 and 233 of the third object 230.

Figure 4:
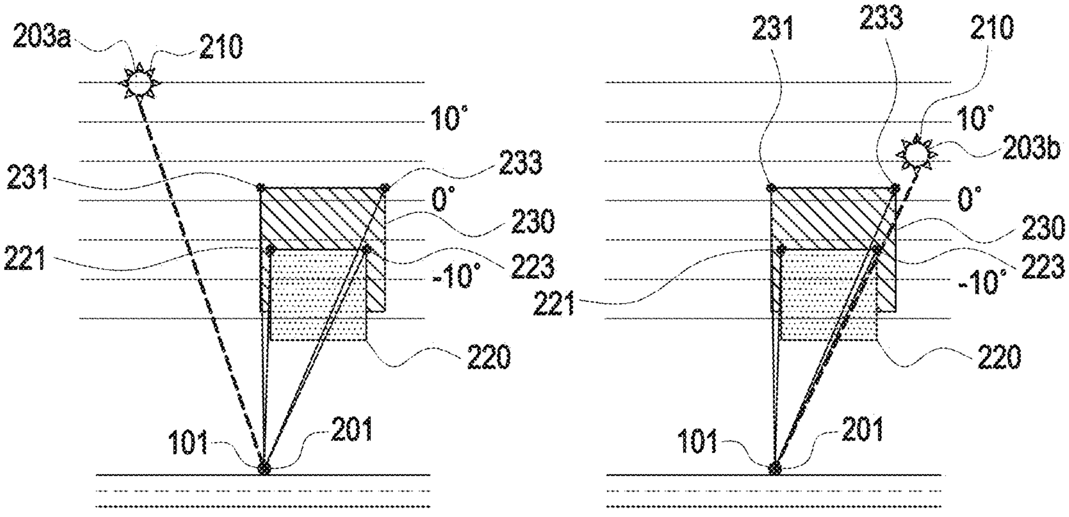
FIG. 4 illustrates an electronic device providing a three-dimensional map according to an embodiment of the disclosure.

According to an embodiment of the disclosure, when the first object 210 moves without movement of the electronic device 101 as illustrated in FIG. 4, the processor 120 may identify whether a height of the celestial body changes based on the identified location of the celestial location. When the height of the celestial body changes, the processor 120 may identify an elevation angle of the first object 210, based on the identified location of the celestial body and identify a distance (d') between the electronic device 101 and each of the feature points 221 and 223 of the second object 220, based on the elevation angle of the first object 210 in addition to the distance (d) between the electronic device 101 and each of the feature points 231 and 233 of the third object 230, the angle change (β-β') of each of the feature points 221 and 223 of the second object 220, and the angle change (α-α') of each of the feature points 231 and 233 of the third object 230.

Figure 5:
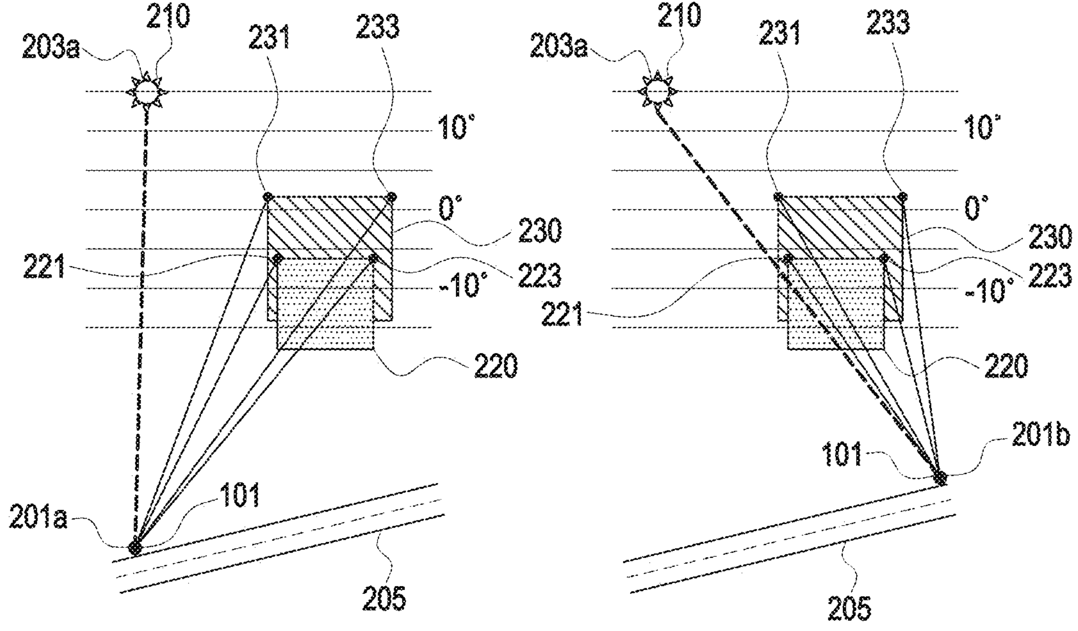
FIG. 5 illustrates an electronic device providing a three-dimensional map according to an embodiment of the disclosure.

According to an embodiment of the disclosure, when the electronic device 101 moves from the first location 201*a* to the second location 201*b* without movement of the first object 210 as illustrated in FIG. 5, the processor 120 may identify whether the height between the first location 201*a* and the second location 201*b* of the electronic device 101 changes on a horizontal plane of a road 205, based on location information of the electronic device 101. When the height of the electronic device 101 changes, the processor 120 may identify the elevation angle of the first object 210, based on the location information of the electronic device 101 and identify the distance (d') between the electronic device 101 and each of the feature points 221 and 223 of the second object 220, based on the elevation angle in addition to the distance (d) between the electronic device 101 and each of the feature points 231 and 233 of the third object 230, the angle change (β-β') of each of the feature points 221 and 223 of the second object 220, and the angle change (α-α') of each of the feature points 231 and 233 of the third object 230. Although the feature points 221 and 223 and the feature points 231 and 233 identified in upper areas of the respective objects are described as examples as illustrated in FIG. 6, the disclosure is not limited thereto and the processor 120 may further extract feature points of other areas according to the predetermined number that may generate a three-dimensional image corresponding to a real shape of the object.

Figure 6:
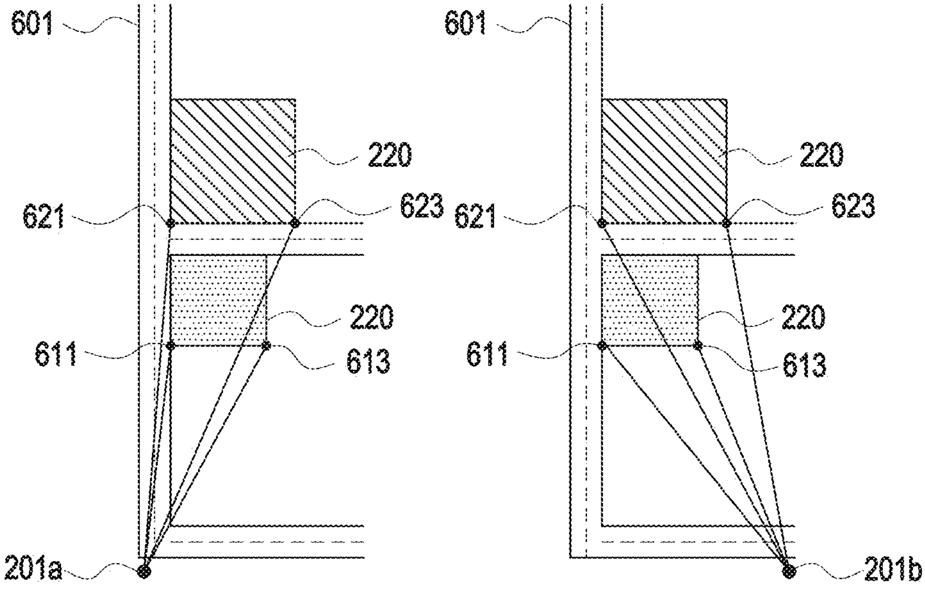
FIG. 6 illustrates an electronic device providing a three-dimensional map according to an embodiment of the disclosure.
Figure 6:
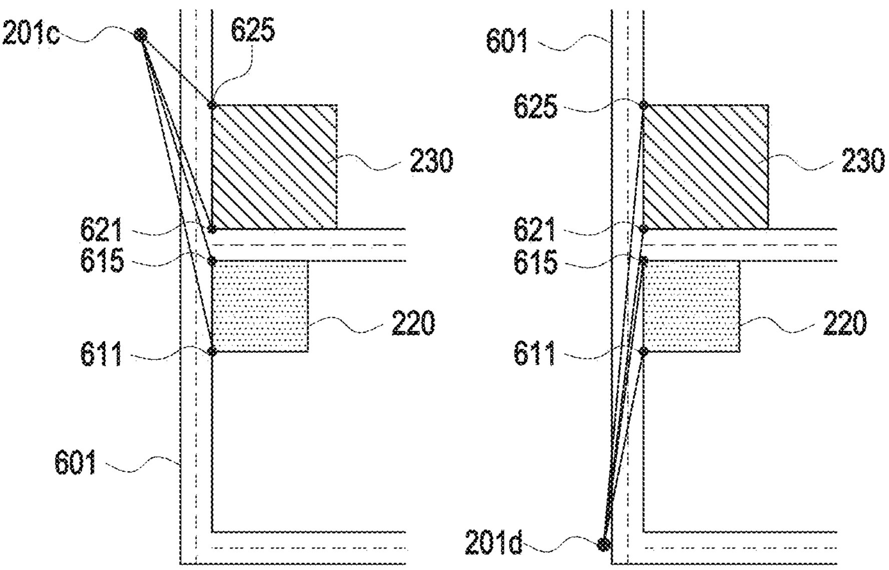

FIG. 6 illustrates an electronic device providing a three-dimensional map according to an embodiment of the disclosure.

Referring to FIG. 6, the processor 120 of the electronic device 101 according to an embodiment may specify locations (or capturing locations) 201*a*, 201*b*, 201*c*, and 201*d* of the electronic device 101 on a three-dimensional map (or a three-dimensional map image) 601 and determine a location and a shape of the second object 220 in the three-dimensional map 601, based on identified distances and angles between the locations 201*a*, 201*b*, 201*c*, and 201*d* of the electronic device 101 and feature points 611, 613, and 615 of the second object 220, the locations 201*a*, 201*b*, 201*c*, and 201*d* of the electronic device 101, and feature points 621, 623, and 625 of the third object 230. The processor 120 may generate three-dimensional image data (for example, a three-dimensional shape or a three-dimensional model) according to the location and the shape of the second object 220 determined through a combination of the feature points 611, 613, and 615 of the second object 220, based on the identified location of the celestial body. The processor 120 may directly update the three-dimensional map 601 by transmitting the three-dimensional image data of the second object 220, generated by the server 108 (or another external electronic device) to update the three-dimensional map 601, to the server 108 or reflecting the same in the three-dimensional map stored in the memory 130. Although the feature points 611, 613, and 615 of the second object 220 and the feature points 621, 623, and 625 of the third object 230 identified in some areas (for example, lower and left areas) are described as examples as illustrated in FIG. 6, the disclosure is not limited thereto and the processor 120 may further extract feature points in other areas according to the predetermined number that may generate a three-dimensional image corresponding to a real shape of the object. When the number of feature points becomes a predetermined number, the processor 120 may generate a three-dimensional image by combining the feature points.

Referring to FIG. 1, the electronic device 101 according to an embodiment may realize a software module (for example, the program 140 of FIG. 1) for providing a three-dimensional map. The memory 130 of the electronic device 101 may store instructions to realize the software module. The processor 120 may execute the instructions stored in the memory 130 to realize the software module and control hardware (for example, the display module 160, the sensor module 176, and the communication module 190 of FIG. 1, or other elements required for providing a three-dimensional map) related to functions of the software module. The software module may include an application related to provision of a three-dimensional map. The application may include location tracking, machine learning, or an image analysis function. The application may include an application received from an external electronic device (for example, the server 108 or the external electronic device 102 or 104). According to an embodiment of the disclosure, the application may include a preloaded application or a third-party application that can be downloaded from the server. The elements of the software module 201 according to the illustrated embodiment and the names of the elements may vary depending on a type of the operating system. According to an embodiment of the disclosure, at least some of the software module 201 may be implemented by software, firmware, hardware, or a combination of two or more thereof. At least some of the software module 201 may be implemented (for example, executed) by, for example, the processor (for example, an application processor (AP)). At least some of the software module 201 may include, for example, a module, a program, routine, sets of instructions, or a process to perform at least one function.

As described above, the embodiment has described main elements of the electronic device through the electronic device 101 of FIG. 1. However, in various embodiments of the disclosure, not all the elements illustrated through FIG. 1 are necessary elements, and the electronic device 101 may be configured by elements larger or fewer than the illustrated elements. Further, locations of the main elements of the electronic device 101 described through FIG. 1 are changeable according to various embodiments.

According to an embodiment of the disclosure, an electronic device (for example, the electronic device 101 of FIG. 1) may include a camera module (for example, the camera module 180 of FIG. 1), memory (for example, the memory 130 of FIG. 1) storing one or more computer programs, and at least one processor (for example, the processor 120 of FIG. 1) electrically connected to the memory and the camera module. According to an embodiment, the one or more computer programs include computer-executable instructions that, when executed by the at least one processor, cause the electronic device to acquire an image captured by the camera module, acquire a three-dimensional map, based on location information of the electronic device, identify, in the image, a first object corresponding to a celestial body and a second object corresponding to a new terrain feature that is not included in the three-dimensional map, acquire three-dimensional image data of the new terrain feature for updating the three-dimensional map, based on information related to the second object identified based on a location of the first object, and provide a three-dimensional map updated through reflection of the acquired image data.

According to an embodiment of the disclosure, the electronic device may further include a communication module electrically connected to the at least one processor, and one or more computer programs further include computer-executable instructions that, when executed by the at least one processor, cause the electronic device to transmit the three-dimensional image data to an external electronic device (for example, the external electronic device 102 or 104 or the server 108 of FIG. 1) to update the three-dimensional map by the external electronic device, receive the three-dimensional map updated by the external electronic device through the communication module, based on the three-dimensional image data, and store the updated three-dimensional map in the memory.

According to an embodiment of the disclosure, the electronic device may further include a display module (for example, the display module 160 of FIG. 1) electrically connected to the at least one processor, and one or more computer programs further include computer-executable instruction that, when executed by the at least one processor, cause the electronic device to control the display module to display the updated three-dimensional map.

According to an embodiment of the disclosure, the electronic device may further include a communication module (for example, the communication module 190 of FIG. 1) electrically connected to the at least one processor, and the one or more computer programs further include computer-executable instruction that, when executed by the at least one processor, cause the electronic device to control the communication module to transmit information related to the location of the first object, information related to at least one terrain feature included in the captured image, and the location information of the electronic device to the external electronic device to update the three-dimensional map by the external electronic device and receive the updated three-dimensional map reflecting the three-dimensional image data generated by the external electronic device from the external electronic device, the information related to the at least one terrain feature may include identification information of the second object, an image part of the second object, or identification information of a third object corresponding to another terrain feature, and the location information of the electronic device may include global positioning system (GPS) information and position information.

According to an embodiment of the disclosure, the one or more computer programs further include computer-executable instructions that, when executed by the at least one processor, cause the electronic device to identify the location of the first object corresponding to the celestial body, based on at least one piece of the location information of the electronic device or information related to the celestial body corresponding to the first object received from the external electronic device.

According to an embodiment of the disclosure, the one or more computer programs further include computer-executable instructions that, when executed by the at least one processor, cause the electronic device to identify a third object corresponding to a terrain feature included in the three-dimensional map and the captured image and acquire feature points of the second object and feature points of the third object by analyzing shapes of the second object and the third object.

According to an embodiment of the disclosure, the one or more computer programs further include computer-executable instructions that, when executed by the at least one processor, cause the electronic device to designate a location of the electronic device in the three-dimensional map, based on the location information of the electronic device, generate the three-dimensional image data, based on distances and angles of the feature points of the second object and distances and angles of the feature points of the third object, the distances and the angles being identified based the location of the first object, and reflect the generated three-dimensional image data to update the three-dimensional map.

According to an embodiment of the disclosure, the one or more computer programs further include computer-executable instructions that, when executed by the at least one processor, cause the electronic device to identify a second location of the first object, based on the first object having moved without movement of the electronic device, identify an angle change of the feature points of the second object between a first location and the second location of the first object, identify an angle change of the feature points of the third object between the first location and the second location of the first object, and identify distances between the electronic device and the feature points of the second object, based on distances between the electronic device and the feature points of the third object, the angle change of the feature points of the second object, and the angle change of the feature points of the third object.

According to an embodiment of the disclosure, the one or more computer programs further include computer-executable instructions that, when executed by the at least one processor, cause the electronic device to identify an elevation angle of the first object, based on the first object having moved without movement of the electronic device and identify the distances of the feature points of the second object, based on the identified elevation angle.

According to an embodiment of the disclosure, the memory may store instructions that, when executed by the at least one processor, cause the electronic device to designate a first location of the electronic device and the location of the first object in the three-dimensional map, at the first location of the electronic device, identify a first angle between the location of the first object and the feature points of the second object and a first angle between the location of the first object and the feature points of the third object, identify a second location of the electronic device, based on the electronic device having moved without movement of the first object, at the second location of the electronic device, identify a second angle between the location of the first object and the feature points of the second object and a second angle between the location of the first object and the feature points of the third object, identify an angle change of the second object, based on the first angle and the second angle of the second object and identify an angle change of the third object, based on the first angle and the second angle of the third object, and calculate distances between the electronic device and the feature points of the second object, based on the distances between the electronic device and the feature points of the third object, the angle change of the second object, and the angle change of the third object.

According to an embodiment of the disclosure, the memory may store instructions that, when executed by the at least one processor, cause the electronic device to identify an elevation angle of the first object by a change in a height of the electronic device, based on the electronic device having moved without movement of the first object and identify the distances between the electronic device and the feature points of the second object, further based on the identified elevation angle.

Figure 7:
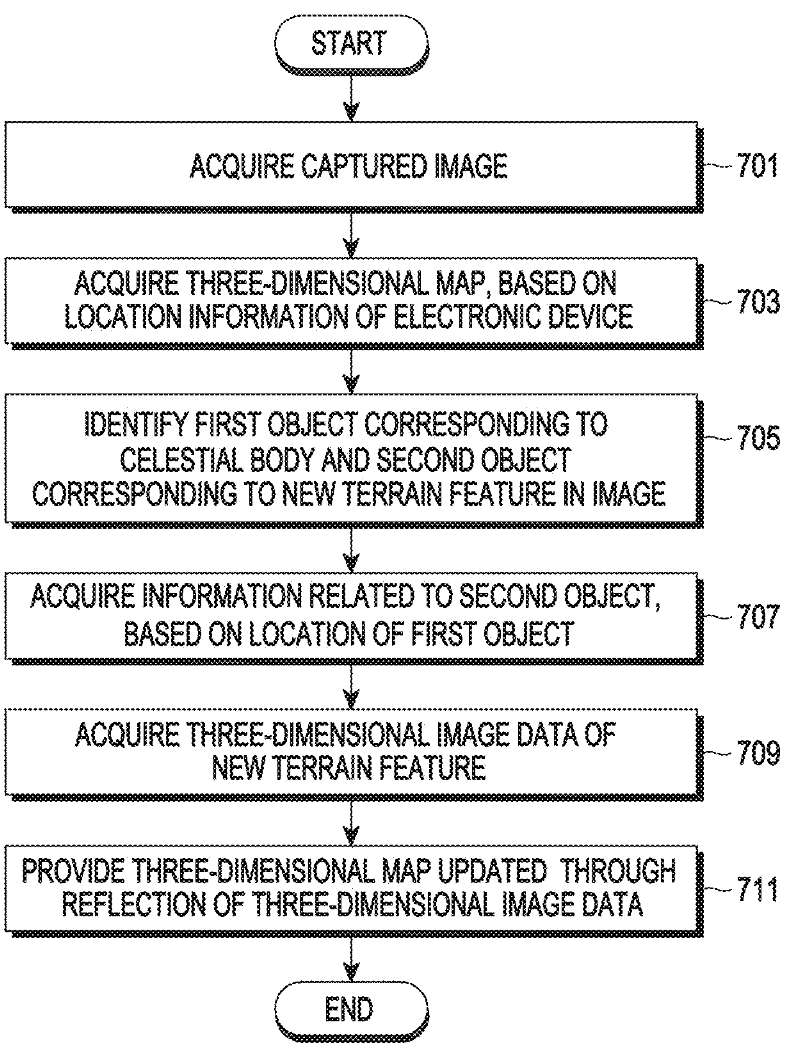
FIG. 7 is a flowchart illustrating a method by which an electronic device provides a three-dimensional map according to an embodiment of the disclosure.

FIG. 7 is a flowchart illustrating a method by which an electronic device provides a three-dimensional map according to an embodiment of the disclosure.

Referring to FIG. 7, in operation 701, an electronic device (for example, the electronic device 101 of FIG. 1) according to an embodiment may acquire an image captured by a camera module (for example, the camera module 180 of FIG. 1). The electronic device may acquire location information (for example, GPS information and position information) of a place in which the image is captured through a location tracking operation. The acquired image may be a two-dimensional image, and may be stored in the memory 130 together with the acquired location information.

In operation 703, the electronic device may acquire a three-dimensional map corresponding to the place in which the image is captured from memory or a server (for example, the server 108), based on the acquired location information.

In operation 705, the electronic device may identify a first object corresponding to a celestial body (for example, sun, moon, or satellite) and a second object corresponding to a new terrain feature in the captured image. The electronic device may identify third objects corresponding to at least one known terrain feature different from the new terrain feature in the captured image. The electronic device may compare objects (or shapes of the objects) for at least one terrain feature identified in the captured image with objects (or shapes of the objects) corresponding to at least one terrain feature identified in the three-dimensional map and identify, as the second object corresponding to the new terrain feature, an object corresponding to a non-matching terrain feature. The electronic device may acquire feature points for the shape of the second object. The electronic device may acquire feature points for the shape of the third object. The electronic device may acquire an image part of the second object from the captured image. The identified image part of the second object may be a part obtained by capturing or cutting one area including the second object from the captured image. The electronic device 101 may generate identification information (ID) of the identified second object. For example, the electronic device 101 may map the identification information of the second object to the image part of the second object and store the same. The electronic device may identify a location (for example, a location according to altitude and azimuth) of a real celestial body corresponding to a first object, based on location information of the electronic device (for example, GPS information (latitude, longitude, altitude, and time information) and position information). The electronic device may transmit information on the first object to the server, and the server may receive information (for example, altitude and azimuth) related to the location of the celestial body found based on the information on the first object. For example, the electronic device may identify the location of the celestial body by calculating a horizontal coordinate value of the celestial body within the margin of error (for example, +/−0.0003 degrees), based on information (azimuth and altitude as the horizontal coordinate value of the celestial body) related to the location of the celestial body.

In operation 707, the electronic device may acquire information (for example, distances and angles of feature points of the second object) related to the second object identified based on the location of the first object. When acquiring information on the second object, based on the location of the first object, the electronic device may calculate the distance of each of the feature points of the second object, based on an angle change between the location of the first object and each of the feature points of the second object and the distance between the location of the first object and each of the feature points of the third object according to movement of the electronic device or movement of the first object as illustrated in FIGS. 2 to 5.

In operation 709, the electronic device may acquire three-dimensional image data (or three-dimensional shape) of the new terrain feature for updating the three-dimensional map, based on information related to the second object. For example, the electronic device may generate three-dimensional image data, based on information (for example, the distance and the angle of each of the feature points of the second object) related to the second object identified, based on the location of the first object, and the identified location of the celestial body. In another example, the electronic device may receive three-dimensional image data generated by an external electronic device, based on information (for example, the distance and the angle of each of the feature points of the second object) related to the second object identified, based on the location of the first object, and the identified location of the celestial body.

In operation 711, the electronic device may provide the three-dimensional map updated through reflection of the acquired three-dimensional image data. For example, the electronic device may reflect the acquired three-dimensional image data to update the three-dimensional map and display the updated three-dimensional map on a display module (for example, the display module 160 of FIG. 1). The electronic device may transmit the updated three-dimensional map to the external electronic device. In another example, the electronic device may transmit the acquired three-dimensional image data of the second object to the server, receive the three-dimensional map updated through reflection of the three-dimensional image data of the second object from the server, and store the same in memory (for example, the memory 130 of FIG. 1).

Figure 8:
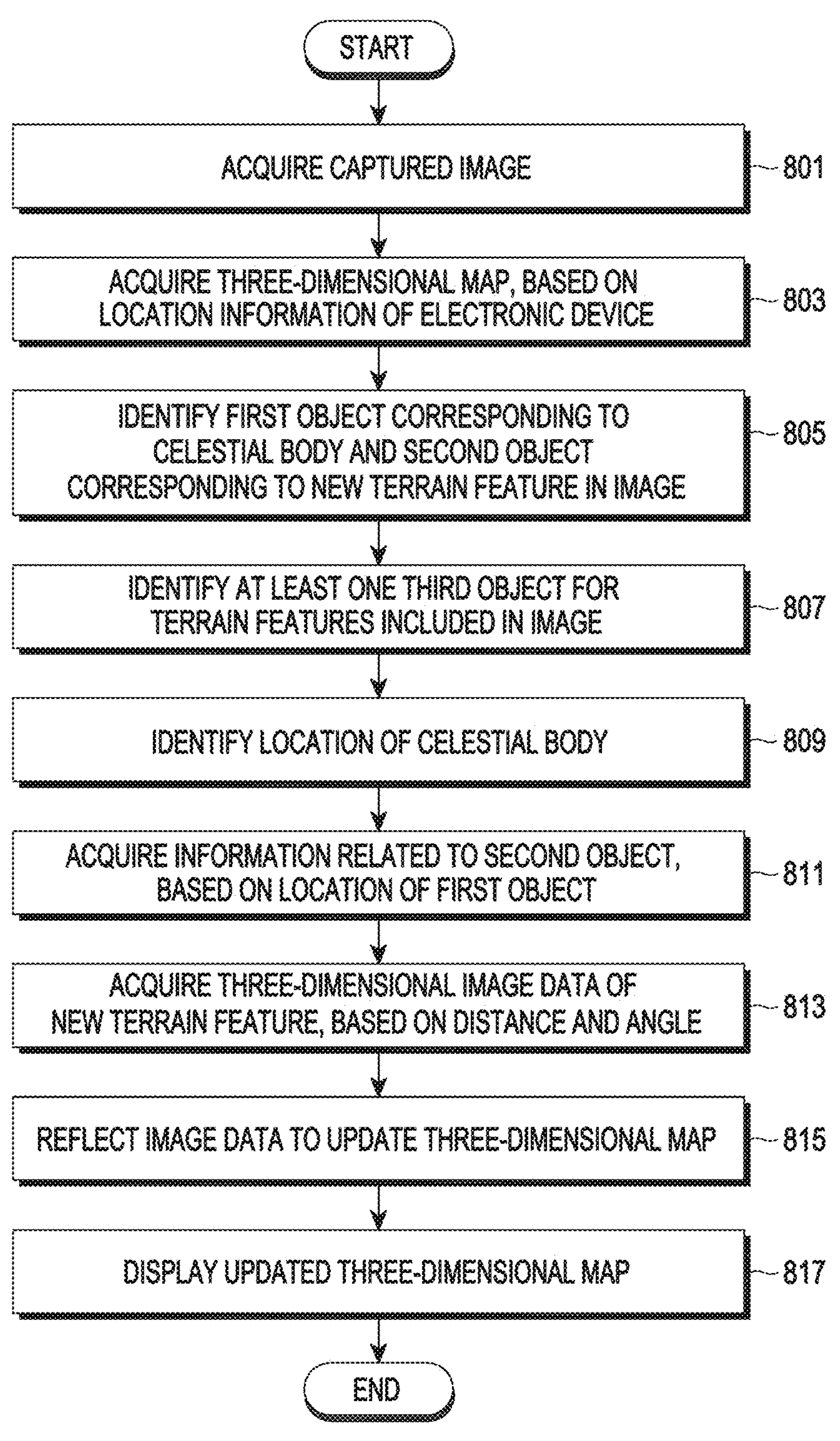
FIG. 8 is a flowchart illustrating a method by which an electronic device provides a three-dimensional map according to an embodiment of the disclosure.

FIG. 8 is a flowchart illustrating a method by which an electronic device provides a three-dimensional map according to an embodiment of the disclosure.

Referring to FIG. 8, in operation 801, an electronic device (for example, the electronic device 101 of FIG. 1) according to an embodiment may acquire an image including a celestial body (for example, sun, moon, or satellite) and at least one new terrain feature. The electronic device may acquire location information of a place in which the image is captured. The acquired image may be an image currently captured through a camera module (for example, the camera module 180 of FIG. 1), an image previously captured and stored in memory, a message received from an external electronic device (for example, the external electronic device 102 or 104 or the server 108 of FIG. 1), or a two-dimensional image. The acquired image may include capturing time and capturing location information. The location information may include GPS information (for example, latitude, longitude, altitude, and time) and position information (for example, roll, pitch, and yaw) that may determine a position, such as a slope of the electronic device.

In operation 803, the electronic device may acquire a three-dimensional map corresponding to the place in which the image is captured from the memory (for example, the memory 130 of FIG. 1) or the external electronic device, based on the acquired location information.

In operation 805, the electronic device may identify a first object corresponding to the celestial body and a second object corresponding to the new terrain feature in the captured image. The electronic device may compare the object (or a shape of the object) for at least one terrain feature identified in the captured image with an object (or a shape of the object) corresponding to at least one terrain feature identified in the three-dimensional map and identify the object corresponding to a non-matching terrain feature as the second object corresponding to the new terrain feature. The electronic device may extract feature points for the shape of the second object. The electronic device may acquire an image part of the second object from the captured image. The identified image part of the second object may be a part obtained by capturing or cutting one area including the second object from the captured image. The electronic device 101 may generate identification information (ID) of the identified second object. For example, the electronic device 101 may map the identification information of the second object to the image part of the second object and store the same.

In operation 807, the electronic device may identify a third object corresponding to another terrain feature in the captured image. The electronic device may identify identification information of the third object corresponding to the other terrain feature, based on information included in the acquired three-dimensional map. The electronic device may acquire feature points for a shape of the third object.

In operation 809, the electronic device may identify a location of a real celestial body corresponding to the first object, based on the location of the first object and location information of the electronic device.

In operation 811, the electronic device may acquire information related to the second object (for example, the distance and angle of feature points of the second object), based on the location of the first object as illustrated in FIGS. 2 to 5. When acquiring the information related to the second object, based on the location of the first object, the electronic device may calculate the distance of each of the feature points of the second object, based on an angle change between the location of the first object and each of the feature points of the second object and the distance between the location of the first object and each of the feature points of the third object according to movement of the electronic device or movement of the first object as illustrated in FIGS. 2 to 5.

In operation 813, the electronic device may acquire three-dimensional image data (or shape) by generating a three-dimensional image indicating a shape of the new terrain feature corresponding to the second object, based on the acquired information related to the second object (for example, the distance and angle of the feature points of the second object). For example, the electronic device may generate three-dimensional image data, based on information related to the second object (for example, the distance and angle of the feature points of the second object) identified, based on the location of the first object, and the identified location of the celestial body.

In operation 815, the electronic device may reflect the three-dimensional image data in the three-dimensional map to update the three-dimensional map.

In operation 817, the electronic device may store the updated three-dimensional map in the memory and display the updated three-dimensional map on a display module (for example, the display module 160 of FIG. 1).

As described in operation 707 of FIG. 7 and operation 811 of FIG. 8, when acquiring the information related to the second object (for example, the distance and angle of the feature points of the second object), based on the location of the first object, the electronic device according to an embodiment may calculate the distance of the feature points of the second object, based on an angle change between the location of the first object and each of the feature points of the second object and the distance between the location of the first object and each of the feature points of the third object according to movement of the electronic device or movement of the first object as illustrated in FIGS. 2 to 5.

According to an embodiment of the disclosure, the electronic device may designate the location (for example, the capturing location) of the electronic device in the captured image acquired based on location information of the electronic device. The electronic device may acquire feature points for a shape of the second object corresponding to the new terrain feature and feature points for a shape of the third object in the captured image.

According to an embodiment of the disclosure, the electronic device may identify an angle (β) between the location of the first object and each of the feature points of the second object, based on the location of the first object, and identify an angle (α) between the location of the first object and each of the feature points of the third object and a distance (d) between the location of the first object and the location of the electronic device, based on the location of the first object. The electronic device may identify a distance (d') of each of the feature points of the second object, based on the angle (β) of each of the feature points of the second object, and the angle (α) and the distance (d) of each of the feature points of the third object.

According to an embodiment of the disclosure, when the electronic device moves without movement of the first object, a second location of the electronic device may be identified, and a second angle (β') between the first location of the first object and each of the feature points of the second object and a second angle (α') between the first location of the first object and each of the feature points of the third object may be identified at the second location, based on the first location of the first object. The electronic device may identify an angle change (β-β') of each of the feature points of the second object, based on the first angle (β) and the second angle (β') of each of the feature points of the second object, and identify an angle change (α-α') of each of the feature points of the third object, based on the first angle (α) and the second (α') of each of the feature points of the third object. The electronic device may identify the distance (d') between the electronic device and each of the feature points of the second object, based on the distance (d) between the location of the electronic device and each of the feature points of the third object, the angle change (β-β') of each of the feature points of the second object 220, and the angle change (α-α') of each of the feature points of the third object.

According to an embodiment of the disclosure, when the first object moves without movement of the electronic device, the electronic device may identify a second location of the first object and identify an angle change of each of the feature points of the second object between the first location and the second location of the first object. The processor 120 may identify the angle change between each of the feature points of the third object, and the first location and the second location of the first object. The electronic device may identify the distance between the electronic device and each of the feature points of the second object, based on the distance between the electronic device and each of the feature points of the third object, the angle change of each of the feature points of the second object, and the angle change of each of the feature points of the third object.

According to an embodiment of the disclosure, when the first object moves without movement of the electronic device, the electronic device may identify whether a height of the celestial body changes based on the identified location of the celestial body. When the height of the celestial body changes, the processor 120 may identify an elevation angle of the first object 210, based on the identified location of the celestial body and identify a distance (d') between the electronic device and each of the feature points of the second object, based on the elevation angle of the first object in addition to the distance (d) between the location of the electronic device and each of the feature points of the third object, the angle change ($\beta$-$\beta'$) of each of the feature points of the second object, and the angle change ($\alpha$-$\alpha'$) of each of the feature points of the third object.

According to an embodiment of the disclosure, when the electronic device moves without movement of the first object, the electronic device may identify whether the height changes with respect to a horizontal plane according to movement of the electronic device 101, based on location information of the electronic device 101. When the height of the electronic device 101 changes, the processor 120 may identify an elevation angle of the first object due to the change in the height of the electronic device, based on the location information of the electronic device 101 and identify a distance (d') between the electronic device and each of the feature points of the second object, based on the identified elevation angle in addition to the distance (d) between the electronic device and each of the feature points of the third object, the angle change ($\beta$-$\beta'$) of each of the feature points of the second object, and the angle change ($\alpha$-$\alpha'$) of each of the feature points of the third object.

Figure 9:
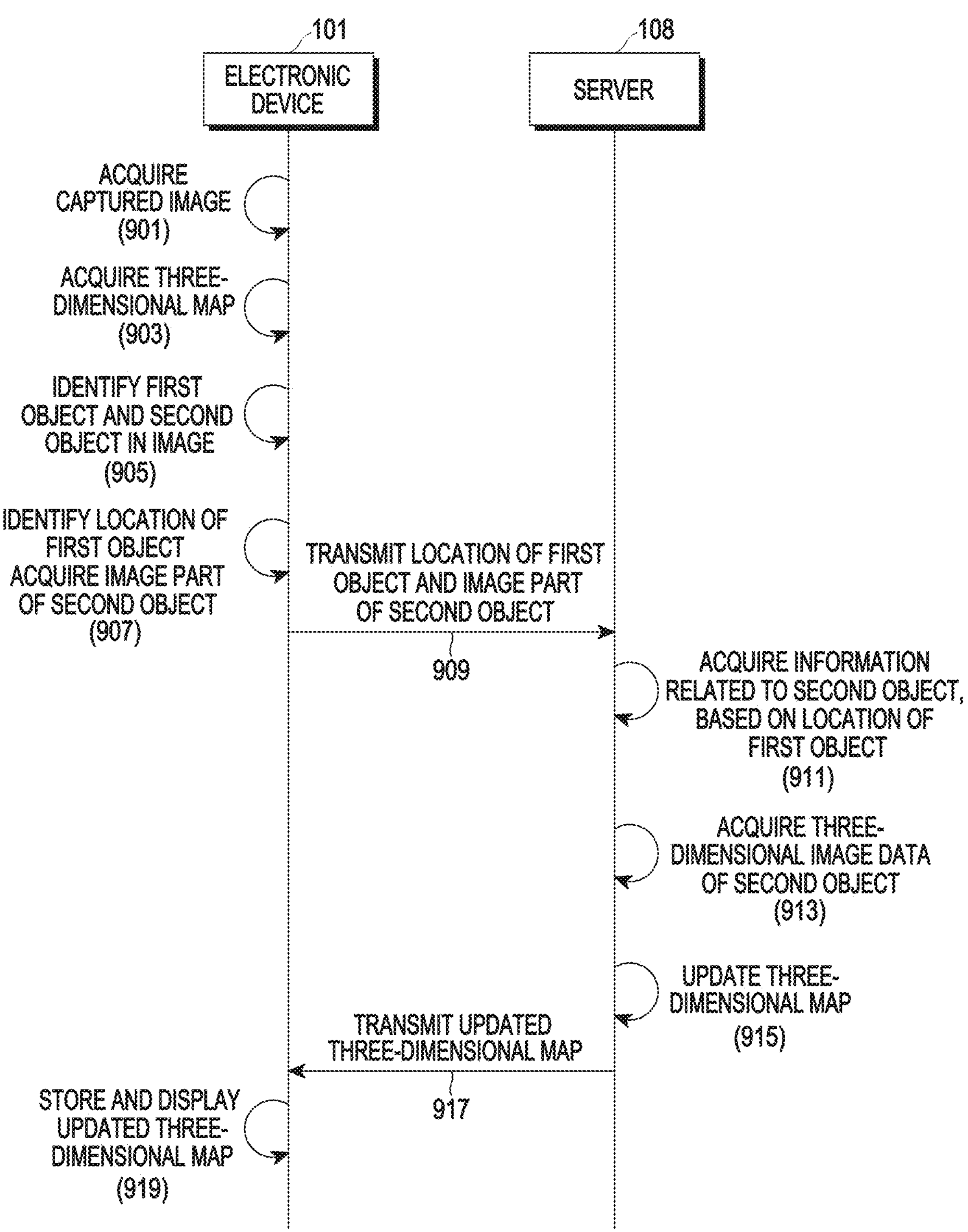
FIG. 9 is a flowchart illustrating a method by which an electronic device provides a three-dimensional map according to an embodiment of the disclosure.

FIG. 9 is a flowchart illustrating a method by which an electronic device provides a three-dimensional map according to an embodiment of the disclosure.

Referring to FIG. 9, in operation 901, the electronic device 101 (for example, the electronic device 101 of FIG. 1) according to an embodiment may acquire an image including a celestial body (for example, sun, moon, or satellite) and at least one terrain feature. The electronic device 101 may acquire location information (for example, GPS information) for a place in which the image is captured. The acquired image may be an image currently captured through a camera module (for example, the camera module 180 of FIG. 1), an image previously captured and stored in memory, or a message received from external electronic device (for example, the external electronic device 102 or 104 or the server 108 of FIG. 1), and may be a two-dimensional image. The acquire image may include capturing time and capturing location information.

In operation 903, the electronic device 101 may acquire a three-dimensional map corresponding to the place in which the image is captured from memory (for example, the memory 130 of FIG. 1) or the server 108 which is an external electronic device, based on the acquired location information.

In operation 905, the electronic device 101 may identify a first object corresponding to the celestial body and a second object corresponding to a new terrain feature in the captured image. The electronic device may compare objects (or shapes of the objects) for at least one terrain feature identified in the captured image with objects (or shapes of the objects) corresponding to at least one terrain feature identified in the three-dimensional map and identify an object corresponding to a non-matching terrain feature as the second object corresponding to the new terrain feature. The electronic device may extract feature points for the shape of the second object.

In operation 907, the electronic device 101 may identify the location of the first object corresponding to the celestial body included in the image and acquire an image part of the second object identified in the image. The identified image part of the second object may be a part obtained by capturing or cutting one area including the second object from the captured image. The electronic device 101 may generate identification information (ID) of the identified second object. For example, the electronic device 101 may map the identification information of the second object to the image part of the second object and store the same.

In operation 909, in order to update the three-dimensional map by the server 108 which is the external electronic device, the electronic device 101 may transmit information for updating the three-dimensional map including at least one of information related to the location of the first object, information related to at least one terrain feature included in the acquired image, location information of the electronic device, or the acquired image to the server 108. The information related to at least one terrain feature included in the image may include identification information of the second object corresponding to the new terrain feature, the image part of the second object, and identification information of the third object corresponding to another terrain feature. The identification information of the third object corresponding to the other terrain feature may be identified based on information included in the acquired three-dimensional map. The information related to the location of the first object may include identification information indicating a type of the celestial body (for example, sun, moon, or satellite) corresponding to the first object and the location of the first object identified in the image. The location information of the electronic device may include GPS information (for example, latitude, longitude, altitude, and time) and position information (for example, roll, pitch, and yaw) for determining the position, such as a slope of the electronic device.

In operation 911, when receiving the information for updating the three-dimensional map from the electronic device 101, the server 108 may calculate the location of the real celestial body corresponding to the first object, based on the location of the first object and location information of the electronic device included in the information for updating the three-dimensional map. The server 108 may acquire information related to the second object (for example, the distance and angle for the feature points of the second object) identified based on the location of the first object as illustrated in FIGS. 2 to 5, operation 707 of FIG. 7, and operation 811 of FIG. 8. When acquiring the information related to the second object (for example, the distance and angle for the feature points of the second object), based on the location of the first object, the electronic device according to an embodiment may calculate the distance of the feature points of the second object, based on the angle change between the location of the first object and the feature points of the second object and the distance between the location of the first object and the feature points of the third object according to movement of the electronic device or movement of the first object as illustrated in FIGS. 2 to 5, operation 707 of FIG. 7, and operation 811 of FIG. 8.

In operation 913, the server 108 may acquire three-dimensional image data (or shape) by generating a three-dimensional image indicating a shape of the new terrain feature corresponding to the second object, based on the acquired information related to the second object (for example, the distance and angle for the feature points of the second object) and the location of the celestial body.

In operation 915, the server 108 may update the three-dimensional map by reflecting the three-image data in the three-dimensional map.

In operation 917, the server 108 may transmit the updated three-dimensional map to the electronic device 101.

In operation 919, the electronic device 101 may store the updated three-dimensional map in memory and display the updated three-dimensional map on a display module (for example, the display module 160 of FIG. 1).

According to an embodiment of the disclosure, a method of operating an electronic device (for example, the electronic device 101 of FIGS. 1 and 2) may include an operation of acquiring an image captured by a camera module (for example, the camera module 180 of FIG. 1) of the electronic device, an operation of acquiring a three-dimensional map, based on location information of the electronic device, an operation of identifying, in the image, a first object corresponding to a celestial body and a second object corresponding to a new terrain feature that is not included in the three-dimensional map, an operation of acquiring three-dimensional image data of the new terrain feature for updating the three-dimensional map, based on information related to the second object identified based on a location of the first object, and an operation of providing a three-dimensional map updated through reflection of the acquired image data.

According to an embodiment of the disclosure, the operation of providing the updated three-dimensional map may include an operation of updating the three-dimensional map by reflecting the three-dimensional image data generated based on distances and angles of feature points of the second object, an operation of storing the updated three-dimensional map in memory (for example, the memory 130 of FIG. 1) of the electronic device, and an operation of displaying the updated three-dimensional map on a display module (for example, the display module 160 of FIG. 1) of the electronic device.

According to an embodiment of the disclosure, the method may further include an operation of transmitting the three-dimensional image data to an external electronic device (for example, the external electronic device 102 or 104 or the server 108 of FIG. 1) to update the three-dimensional map by the external electronic device, an operation of receiving the three-dimensional map updated by the external electronic device through a communication module (for example, the communication module 190 of FIG. 1) of the electronic device, based on the three-dimensional image data, and an operation of storing the updated three-dimensional map in the memory (for example, the memory 130 of FIG. 1) of the electronic device.

According to an embodiment of the disclosure, the method may further include an operation of transmitting information related to the location of the first object, information related to at least one terrain feature included in the captured image, and the location information of the electronic device to the external electronic device to update the three-dimensional map by the external electronic device (for example, the external electronic device 102 or 104 or the server 108 of FIG. 1), an operation of receiving the updated three-dimensional map reflecting the three-dimensional image data generated by the external electronic device from the external electronic device through the communication module of the electronic device, and an operation of storing the updated three-dimensional map in the memory, the information related to the at least one terrain feature may include a shape image of the second object, a shape image of a third object corresponding to another terrain feature, and identification information of the second object, and the location information of the electronic device may include GPS information and position information.

According to an embodiment of the disclosure, the operation of acquiring the three-dimensional image data of the new terrain feature may include an operation of identifying a third object corresponding to a terrain feature included in the three-dimensional map and the captured image, an operation of identifying a second location of the first object, based on the first object having moved without movement of the electronic device, an operation of identifying an angle change of feature points of the second object between a first location and a second location of the first object, identifying an angle change of feature points of the third object between the first location and the second location of the first object, and identifying distances between the electronic device and the feature points of the second object, based on distances between the electronic device and the feature points of the third object, the angle change of the feature points of the second object, and the angle change of the feature points of the third object According to an embodiment of the disclosure, the operation of acquiring the three-dimensional image data of the new terrain feature may further include an operation of identifying an elevation angle of the first object, based on the first object having moved without movement of the electronic device, and the distances of the feature points of the second object may be identified further based on the elevation angle.

According to an embodiment of the disclosure, the operation of acquiring the three-dimensional image data of the new terrain feature may include an operation of identifying a third object corresponding to a terrain feature included in the three-dimensional map and the captured image, an operation of at a first location of the electronic device, identifying a first angle between the location of the first object and the feature points of the second object and a first angle between the location of the first object and the feature points of the third object, an operation of identifying a second location of the electronic device, based on the electronic device having moved without movement of the first object, an operation of at the second location of the electronic device, identifying a second angle between the location of the first object and the feature points of the second object and a second angle between the location of the first object and the feature points of the third object, an operation of identifying an angle change of the second object, based on the first angle and the second angle of the second object and identify an angle change of the third object, based on the first angle and the second angle of the third object, and an operation of identifying distances between the electronic device and the feature points of the second object, based on the distances between the electronic device and the feature points of the third object, the angle change of the second object, and the angle change of the third object.

According to an embodiment of the disclosure, the operation of acquiring the three-dimensional image data of the new terrain feature may further include an operation of identifying an elevation angle of the first object by a change in a height of the electronic device, based on the electronic device having moved without movement of the first object, and the distances of the feature points of the second object may be identified further based on the identified elevation angle.

According to an embodiment of the disclosure, a non-transitory storing medium for storing a program including executable instructions that, when executed by a processor of an electronic device, cause the electronic device to acquire an image captured by a camera module of the electronic device, acquire a three-dimensional map, based on location information of the electronic device, identify, in the image, a first object corresponding to a celestial body and a second object corresponding to a new terrain feature that is not included in the three-dimensional map, acquire three-dimensional image data (or shape) of the new terrain feature for updating the three-dimensional map, based on information related to the second object identified based on a location of the first object, and provide a three-dimensional map updated through reflection of the acquired image data.

Embodiments disclosed in this document are presented for explanation and understanding of the disclosed technology, and do not limit the scope of the technology disclosed in this document. Accordingly, the scope of this document should be construed to include all modifications based on the technical idea of this document or various other embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

camera circuitry;

memory storing one or more computer programs; and one or more processors communicatively coupled to the memory and the camera circuitry, wherein the one or more computer programs include computer-executable instructions that, when executed by the one or more processors individually or collectively, cause the electronic device to:

acquire an image captured by the camera circuitry on a terrain, acquire location information of the electronic device corresponding to a place at which the electronic device captured the image, acquire a three-dimensional map based on the location information of the electronic device, identify, in the image, a first object corresponding to a celestial body and a second object corresponding to a new terrain feature not included in the three-dimensional map, based on identifying the first object corresponding to the celestial body and the second object corresponding to the new terrain feature not included in the three-dimensional map, acquire three-dimensional image data of the new terrain feature for updating the three-dimensional map based on information related to the second object identified based on a location of the first object corresponding to the celestial body, and provide an updated three-dimensional map updated through reflection of the three-dimensional image data.

2. The electronic device of claim 1, further comprising:

communication circuitry electrically connected to the one or more processors; and a display electrically connected to the one or more processors, wherein the one or more computer programs include computer-executable instructions that, when executed by one or more processors individually or collectively, further cause the electronic device to:

transmit, through the communication circuitry to an external electronic device, the three-dimensional image data to update the three-dimensional map by the external electronic device, receive, through the communication circuitry from the external electronic device, the updated three-dimensional map updated by the external electronic device based on the three-dimensional image data, store, in the memory, the updated three-dimensional map, and control the display to display the updated three-dimensional map.

3. The electronic device of claim 2, wherein the one or more computer programs further include computer-executable instructions that, when executed by one or more processors individually or collectively, further cause the electronic device to:

transmit, through the communication circuitry to the external electronic device, information related to the location of the first object, information related to at least one terrain feature included in the image, and the location information of the electronic device to update the three-dimensional map by the external electronic device, and receive, through the communication circuitry from the external electronic device, the updated three-dimensional map generated by the external electronic device and reflecting the three-dimensional image data, wherein the information related to the at least one terrain feature includes identification information of the second object, an image part of the second object, or identification information of a third object corresponding to another terrain feature, and wherein the location information of the electronic device includes global positioning system (GPS) information and position information.

4. The electronic device of claim 3, wherein the one or more computer programs include computer-executable instructions that, when executed by one or more processors individually or collectively, further cause the electronic device to:

identify the location of the first object corresponding to the celestial body based on at least one piece of the location information of the electronic device or information related to the celestial body corresponding to the first object received from the external electronic device.

5. The electronic device of claim 1, wherein the one or more computer programs include computer-executable instructions that, when executed by one or more processors individually or collectively, further cause the electronic device to:

identify a third object corresponding to a terrain feature included in the three-dimensional map and the image, and acquire feature points of the second object and feature points of the third object by analyzing shapes of the second object and the third object.

6. The electronic device of claim 5, wherein the one or more computer programs include computer-executable instructions that, when executed by one or more processors individually or collectively, further cause the electronic device to:

designate a location of the electronic device in the three-dimensional map based on the location information of the electronic device, generate the three-dimensional image data based on distances and angles of the feature points of the second object and distances and angles of the feature points of the third object, the distances and the angles being identified based the location of the first object, and reflect the three-dimensional image data to update the three-dimensional map.

7. The electronic device of claim 6, wherein the one or more computer programs include computer-executable instructions that, when executed by one or more processors individually or collectively, further cause the electronic device to:

identify a second location of the first object based on the first object having moved without movement of the electronic device, identify an angle change of the feature points of the second object between a first location and the second location of the first object, identify an angle change of the feature points of the third object between the first location and the second location of the first object, identify distances between the electronic device and the feature points of the second object based on distances between the electronic device and the feature points of the third object, the angle change of the feature points of the second object, and the angle change of the feature points of the third object, identify an elevation angle of the first object based on the first object having moved without movement of the electronic device, and identify the distances of the feature points of the second object further based on the identified elevation angle.

8. The electronic device of claim 7, wherein the one or more computer programs include computer-executable instructions that, when executed by one or more processors individually or collectively, further cause the electronic device to:

designate a first location of the electronic device and the location of the first object in the three-dimensional map, at the first location of the electronic device, identify a first angle between the location of the first object and the feature points of the second object and a first angle between the location of the first object and the feature points of the third object, identify a second location of the electronic device based on the electronic device having moved without movement of the first object, at the second location of the electronic device, identify a second angle between the location of the first object and the feature points of the second object and a second angle between the location of the first object and the feature points of the third object, identify an angle change of the second object based on the first angle and the second angle of the second object and identify an angle change of the third object based on the first angle and the second angle of the third object, calculate distances between the electronic device and the feature points of the second object based on the distances between the electronic device and the feature points of the third object, the angle change of the second object, and the angle change of the third object, identify an elevation angle of the first object by a change in a height of the electronic device based on the electronic device having moved without movement of the first object, and identify the distances between the electronic device and the feature points of the second object further based on the elevation angle.

9. The electronic device of claim 1, wherein the identifying of the second object corresponding to the new terrain feature not included in the three-dimensional map includes comparing the image captured by the electronic device and the three-dimensional map acquired by the electronic device.

10. A method performed by an electronic device, the method comprising:

acquiring an image captured by camera circuitry of the electronic device on a terrain;

acquiring location information of the electronic device corresponding to a place at which the electronic device captured the image;

acquiring a three-dimensional map based on the location information of the electronic device;

identifying, in the image, a first object corresponding to a celestial body and a second object corresponding to a new terrain feature not included in the three-dimensional map;

based on identifying the first object corresponding to the celestial body and the second object corresponding to the new terrain feature not included in the three-dimensional map, acquiring three-dimensional image data of the new terrain feature for updating the three-dimensional map based on information related to the second object identified based on a location of the first object corresponding to the celestial body; and providing an updated three-dimensional map updated through reflection of the three-dimensional image data.

11. The method of claim 10, wherein the providing of the updated three-dimensional map comprises:

updating the three-dimensional map by reflecting the three-dimensional image data generated based on distances and angles of feature points of the second object;

storing the updated three-dimensional map in memory of the electronic device; and displaying the updated three-dimensional map on a display of the electronic device.

12. The method of claim 11, further comprising:

transmitting, through communication circuitry of the electronic device to an external electronic device, the three-dimensional image data to update the three-dimensional map by the external electronic device;

receiving, through the communication circuitry from the external electronic device, the updated three-dimensional map updated by the external electronic device based on the three-dimensional image data; and storing the updated three-dimensional map in the memory of the electronic device.

13. The method of claim 12, further comprising:

transmitting, through the communication circuitry to the external electronic device, information related to the location of the first object, information related to at least one terrain feature included in the image, and the location information of the electronic device to update the three-dimensional map by the external electronic device;

receiving, through the communication circuitry from the external electronic device, the updated three-dimensional map reflecting the three-dimensional image data generated by the external electronic device; and storing the updated three-dimensional map in the memory of the electronic device, wherein the information related to the at least one terrain feature comprises a shape image of the second object, a shape image of a third object corresponding to another terrain feature, and identification information of the second object, and wherein the location information of the electronic device comprises global positioning system (GPS) information and position information.

14. The method of claim 12, further comprising:

identifying the location of the first object corresponding to the celestial body based on at least one piece of the location information of the electronic device or information related to the celestial body corresponding to the first object received from the external electronic device.

15. The method of claim 10, wherein the acquiring of the three-dimensional image data of the new terrain feature comprises:

identifying a third object corresponding to a terrain feature included in the three-dimensional map and the image;

identifying a second location of the first object, object based on the first object having moved without movement of the electronic device;

identifying an angle change of feature points of the second object between a first location and a second location of the first object;

identifying an angle change of feature points of the third object between the first location and the second location of the first object; and identifying distances between the electronic device and the feature points of the second object based on distances between the electronic device and the feature points of the third object, the angle change of the feature points of the second object, and the angle change of the feature points of the third object, wherein the acquiring of the three-dimensional image data of the new terrain feature further comprises identifying an elevation angle of the first object based on the first object having moved without movement of the electronic device, and wherein the distances of the feature points of the second object are identified further based on the elevation angle.

16. The method of claim 15, wherein the acquiring of the three-dimensional image data of the new terrain feature comprises:

identifying a third object corresponding to a terrain feature included in the three-dimensional map and the image;

at a first location of the electronic device, identifying a first angle between the location of the first object and the feature points of the second object and a first angle between the location of the first object and the feature points of the third object;

identifying a second location of the electronic device based on the electronic device having moved without movement of the first object;

at the second location of the electronic device, identifying a second angle between the location of the first object and the feature points of the second object and a second angle between the location of the first object and the feature points of the third object;

identifying an angle change of the second object based on the first angle and the second angle of the second object;

identifying an angle change of the third object based on the first angle and the second angle of the third object; and identifying distances between the electronic device and the feature points of the second object based on the distances between the electronic device and the feature points of the third object, the angle change of the second object, and the angle change of the third object, wherein the acquiring of the three-dimensional image data of the new terrain feature further comprises identifying an elevation angle of the first object by a change in a height of the electronic device based on the electronic device having moved without movement of the first object, and wherein the distances of the feature points of the second object are identified further based on the identified elevation angle.

17. One or more non-transitory computer-readable storage media storing computer-executable instructions that, when executed by one or more processors of an electronic device individually or collectively, cause the electronic device to perform operations, the operations comprising:

acquiring an image captured by camera circuitry of the electronic device on a terrain;

acquiring location information of the electronic device corresponding to a place at which the electronic device captured the image;

acquiring a three-dimensional map based on the location information of the electronic device;

identifying, in the image, a first object corresponding to a celestial body and a second object corresponding to a new terrain feature not included in the three-dimensional map;

based on identifying the first object corresponding to the celestial body and the second object corresponding to the new terrain feature not included in the three-dimensional map, acquiring three-dimensional image data of the new terrain feature for updating the three-dimensional map based on information related to the second object identified based on a location of the first object corresponding to the celestial body; and providing an updated three-dimensional map updated through reflection of the three-dimensional image data.

18. The one or more non-transitory computer-readable storage media of claim 16, wherein the providing of the updated three-dimensional map comprises:

updating the three-dimensional map by reflecting the three-dimensional image data generated based on distances and angles of feature points of the second object;

storing the updated three-dimensional map in memory of the electronic device; and displaying the updated three-dimensional map on a display of the electronic device.

19. The one or more non-transitory computer-readable storage media of claim 18, the operations further comprising:

transmitting, through communication circuitry of the electronic device to an external electronic device, the three-dimensional image data to update the three-dimensional map by the external electronic device;

receiving, through the communication circuitry from the external electronic device, the updated three-dimensional map updated by the external electronic device based on the three-dimensional image data; and storing the updated three-dimensional map in the memory of the electronic device.

20. The one or more non-transitory computer-readable storage media of claim 19, the operations further comprising:

transmitting, through the communication circuitry to the external electronic device, information related to the location of the first object, information related to at least one terrain feature included in the image, and the location information of the electronic device to update the three-dimensional map by the external electronic device;

receiving, through the communication circuitry from the external electronic device, the updated three-dimensional map reflecting the three-dimensional image data generated by the external electronic device; and storing the updated three-dimensional map in the memory of the electronic device, wherein the information related to the at least one terrain feature comprises a shape image of the second object, a shape image of a third object corresponding to another terrain feature, and identification information of the second object, and wherein the location information of the electronic device comprises global positioning system (GPS) information and position information.

21. The one or more non-transitory computer-readable storage media of claim 17, wherein the acquiring of the three-dimensional image data of the new terrain feature comprises:

identifying a third object corresponding to a terrain feature included in the three-dimensional map and the image;

identifying a second location of the first object based on the first object having moved without movement of the electronic device;

identifying an angle change of feature points of the second object between a first location and a second location of the first object;

identifying an angle change of feature points of the third object between the first location and the second location of the first object; and identifying distances between the electronic device and the feature points of the second object based on distances between the electronic device and the feature points of the third object, the angle change of the feature points of the second object, and the angle change of the feature points of the third object, wherein the acquiring of the three-dimensional image data of the new terrain feature further comprises identifying an elevation angle of the first object based on the first object having moved without movement of the electronic device, and wherein the distances of the feature points of the second object are identified further based on the elevation angle.

* * * * *